(12) United States Patent
Krah et al.

(10) Patent No.: US 7,622,950 B2
(45) Date of Patent: Nov. 24, 2009

(54) GPIO MUX/DYNAMIC PORT CONFIGURATION

(75) Inventors: Christoph Horst Krah, Los Altos, CA (US); Richard James Reeve, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 39 days.

(21) Appl. No.: 11/650,184

(22) Filed: Jan. 3, 2007

(65) Prior Publication Data

US 2008/0162739 A1 Jul. 3, 2008

(51) Int. Cl.
*H01L 25/00* (2006.01)

(52) U.S. Cl. ............................. 326/41; 326/37; 326/47; 710/14

(58) Field of Classification Search ............... 326/37–47
See application file for complete search history.

(56) References Cited

U.S. PATENT DOCUMENTS

| | | | | |
|---|---|---|---|---|
| 6,094,064 A | * | 7/2000 | Mejia et al. ..................... | 326/39 |
| 6,927,601 B1 | * | 8/2005 | Lin et al. ......................... | 326/41 |
| 7,071,733 B2 | * | 7/2006 | Fernald et al. ................. | 326/41 |
| 7,129,747 B1 | * | 10/2006 | Jang et al. ....................... | 326/38 |
| 7,135,888 B1 | * | 11/2006 | Hutton et al. .................. | 326/41 |
| 7,170,315 B2 | * | 1/2007 | Bakker et al. ................. | 326/38 |
| 7,221,185 B1 | * | 5/2007 | Yu et al. ......................... | 326/38 |
| 7,251,805 B2 | * | 7/2007 | Koo ............................. | 716/16 |
| 7,345,508 B1 | * | 3/2008 | Jang et al. ...................... | 326/41 |

* cited by examiner

*Primary Examiner*—Vibol Tan
*Assistant Examiner*—Christopher Lo
(74) *Attorney, Agent, or Firm*—Morrison & Foerster LLP (57) ABSTRACT

Dynamically configurable routing logic coupled between physical I/O ports and special purpose I/O associated with functions within a panel ASIC is disclosed that provide different routing configurations between the physical I/O ports and the special purpose I/O. In one routing configuration, any special purpose output can be coupled to one or more physical I/O ports, providing flexibility to route any functional I/O to any physical I/O port. In a second routing configuration, any input signal on a physical I/O port can be coupled to one or more special purpose inputs. In a third routing configuration, the input signals on a number of physical I/O ports can be configured to independently assert a single special purpose input for interrupt triggering. The dynamically configurable nature of the routing logic allows routing to be changed on the fly.

28 Claims, 5 Drawing Sheets

GPIO MUX/DYNAMIC PORT CONFIGURATION

FIELD OF THE INVENTION

This invention relates to ASIC logic designs, and more particularly, to dynamically configurable routing logic coupled between physical I/O ports and special purpose I/O associated with functions within a panel ASIC that provides for a number of different routing configurations.

BACKGROUND OF THE INVENTION

Many types of input devices are presently available for performing operations in a computing system, such as buttons or keys, mice, trackballs, touch panels, joysticks, touch screens and the like. Touch screens, in particular, are becoming increasingly popular because of their ease and versatility of operation as well as their declining price. Touch screens can include a touch panel, which can be a clear panel with a touch-sensitive surface. The touch panel can be positioned in front of a display screen so that the touch-sensitive surface covers the viewable area of the display screen. Touch screens can allow a user to make selections and move a cursor by simply touching the display screen via a finger or stylus. In general, the touch screen can recognize the touch and position of the touch on the display screen, and the computing system can interpret the touch and thereafter perform an action based on the touch event.

Touch panels can include an array of touch sensors capable of detecting touch events (the touching of fingers or other objects upon a touch-sensitive surface). Future panels may be able to detect multiple touches (the touching of fingers or other objects upon a touch-sensitive surface at distinct locations at about the same time) and near touches (fingers or other objects within the near-field detection capabilities of their touch sensors), and identify and track their locations. Examples of multi-touch panels are described in Applicant's co-pending U.S. application Ser. No. 10/842,862 entitled "Multipoint Touchscreen," filed on May 6, 2004 and published as U.S. Published Application No. 2006/0097991 on May 11, 2006, the contents of which are incorporated by reference herein.

Proximity sensors are another type of input device capable of detecting hover events (the no-touch, close proximity hovering of fingers or other objects above a surface but outside the near-field detection capabilities of touch sensors) as well as touch events. Proximity sensors can be employed singly or in a few important locations in a computing system, or can be arranged in panels. Proximity sensor panels may be able to detect multiple instances of hovering referred to herein as multi-hover events (the hovering of fingers or other objects above a surface at distinct locations at about the same time). Examples of a proximity sensor, a proximity sensor panel, a multi-hover panel and a computing system using both a multi-touch panel and proximity sensors are described in Applicant's co-pending U.S. application Ser. No. 11/649,998 entitled "Proximity and Multi-Touch Sensor Detection and Demodulation," filed on Jan. 3, 2007, the contents of which are incorporated by reference herein.

Proximity sensor panels can be employed either alone or in combination with multi-touch panels. In addition, it is noted that some touch sensors, particularly capacitive touch sensors, can detect some hovering or proximity. Proximity sensors, as referred to herein, are understood to be distinct from touch sensors, including touch sensors that have some ability to detect proximity. Multi-touch sensor panels capable of detecting multi-touch events and multi-hover sensor panels capable of detecting multi-hover events may collectively be referred to herein as multi-event sensor panels.

Both touch sensor panels and proximity sensor panels can be formed as an array of rows and columns of sensors. To scan a sensor panel, a stimulus can be applied to one row with all other rows held at DC voltage levels. When a row is stimulated, a modulated output signal can appear on the columns of the sensor panel. The columns can be connected to analog channels (also referred to herein as event detection and demodulation circuits). For every row that is stimulated, each analog channel connected to a column generates an output value representative of an amount of change in the modulated output signal due to a touch or hover event occurring at the sensor located at the intersection of the stimulated row and the connected column. After analog channel output values are obtained for every column in the sensor panel, a new row is stimulated (with all other rows once again held at DC voltage levels), and additional analog channel output values are obtained. When all rows have been stimulated and analog channel output values have been obtained, the sensor panel is said to have been "scanned," and a complete "image" of touch or hover can be obtained over the entire sensor panel. This image of touch or hover can include an analog channel output value for every pixel (row and column) in the panel, each output value representative of the amount of touch or hover that was detected at that particular location.

The scanning of a sensor panel as described above can be performed under control of a panel processor and a panel subsystem, which can include analog channels for receiving signals from the sensor panel, driver logic for sending signals to the sensor panel, and channel scan logic for controlling the scanning of a sensor panel. The panel processor and panel subsystem can be incorporated into a single application specific integrated circuit (ASIC). The circuitry within the ASIC may be configurable so that the same ASIC can be used in a number of different sensor panel configurations and applications.

However, conventional ASICs are often capable of providing more functionality that can be accommodated by their physical I/O pins. ASIC gate counts and densities have improved to the point where packaging and physical I/O limitations can place practical limits on ASIC functionality as opposed to the number of gates required to implement the desired functionality.

Furthermore, because ASICs are expensive to design and build, it is desirable to make ASIC designs configurable so that a single ASIC design can be used in a number of different configurations and applications. However, because configurable ASIC designs may require a group of I/O pins to be uniquely dedicated to each configurable function, the scarcity of I/O pins can be exacerbated.

SUMMARY OF THE INVENTION

Dynamically configurable routing logic coupled between physical I/O ports and special purpose I/O associated with functions within a panel ASIC provides for a number of different routing configurations between the physical I/O ports and the special purpose I/O.

In one routing configuration, any special purpose output can be coupled to one or more physical I/O ports, providing flexibility to route any functional I/O to any physical I/O port. For example, the same stimulation signal can be routed to multiple physical I/O ports for multi-line sensor panel stimulation. The routing logic also provides for a second routing configuration in which any input signal on a physical I/O port can be coupled to one or more special purpose inputs. In a third routing configuration, the input signals on a number of physical I/O ports can be configured to independently assert a single special purpose input for interrupt triggering.

The dynamically configurable nature of the routing logic allows routing to be changed on the fly, enabling one functional circuit within the panel ASIC to access multiple different external devices through multiple physical I/O ports at different times during operation.

The routing logic provides connections between M+1 physical I/O ports and N+1 special purpose I/O using port logic and OR gates. Port logic is replicated once for every physical I/O port, and one OR gate is replicated for every special purpose I/O.

First, the routing of an output signal from a special purpose I/O to a physical I/O port will be described. Each special purpose output line from every special purpose I/O is routed to each port logic instance. In other words, there are N+1 port logic outputs feeding into port logic. Multiplexing logic in port logic selects one of these N+1 port logic outputs (which correspond to the special purpose output lines) to pass through port output line to physical I/O port. Note that each replicated instance of port logic can select the same or a different special purpose output line to pass on to physical I/O port.

Next, the routing of port input line from a physical I/O port to a special purpose I/O will be described. Decoding logic (described hereinafter) in port logic gates port input line to one or more of N+1 port logic inputs, with each port logic input connected to a particular one of N+1 OR gates, each of which drives a different special purpose input line. Thus, the gated port input line will be reflected at special purpose input line only if all other inputs to that particular OR gate are at a logic zero. However, the appearance of a logic one at any input of OR gate will place a logic one on special purpose input line.

A port control line is generated from a register (described hereinafter) within port logic, and controls whether the physical I/O port is configured as and input or an output. The register can be programmed via a programming input.

Port logic includes a port control register which is programmable via programming input by the panel processor within the ASIC, or an external processor through either the auxiliary SPI interface or the host SPI interface. A data direction register (DDR) in the port control register controls the port control line, and therefore the direction of the corresponding physical I/O port.

A port input select field controls a decoder, which then asserts one or more input select signals to an AND gate corresponding to a particular pad logic output line, which enables a signal on pad input line to appear on the corresponding pad logic output line. A pad output select field controls a multiplexer, which selects only one port logic output and allows it to pass to a port output line. At any time during operation, a processor can write new values into the port control registers associated with each physical I/O port and dynamically reconfigure the connection of physical I/O ports to special purpose I/O. Note that in some embodiments, each port control register for each physical I/O port can be forced to default values upon power up.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Dynamically configurable routing logic coupled between physical I/O ports and special purpose I/O associated with functions within a panel ASIC provides for a number of different routing configurations between the physical I/O ports and the special purpose I/O. In one routing configuration, any special purpose output can be coupled to one or more physical I/O ports, providing flexibility to route any functional I/O to any physical I/O port. For example, the same stimulation signal can be routed to multiple physical I/O ports for multi-line sensor panel stimulation. The routing logic also provides for a second routing configuration in which any input signal on a physical I/O port can be coupled to one or more special purpose inputs. In a third routing configuration, the input signals on a number of physical I/O ports can be configured to independently assert a single special purpose input for interrupt triggering. The dynamically configurable nature of the routing logic allows routing to be changed on the fly, enabling one functional circuit within the panel ASIC to access multiple different external devices through multiple physical I/O ports at different times during operation.

Figure 1:
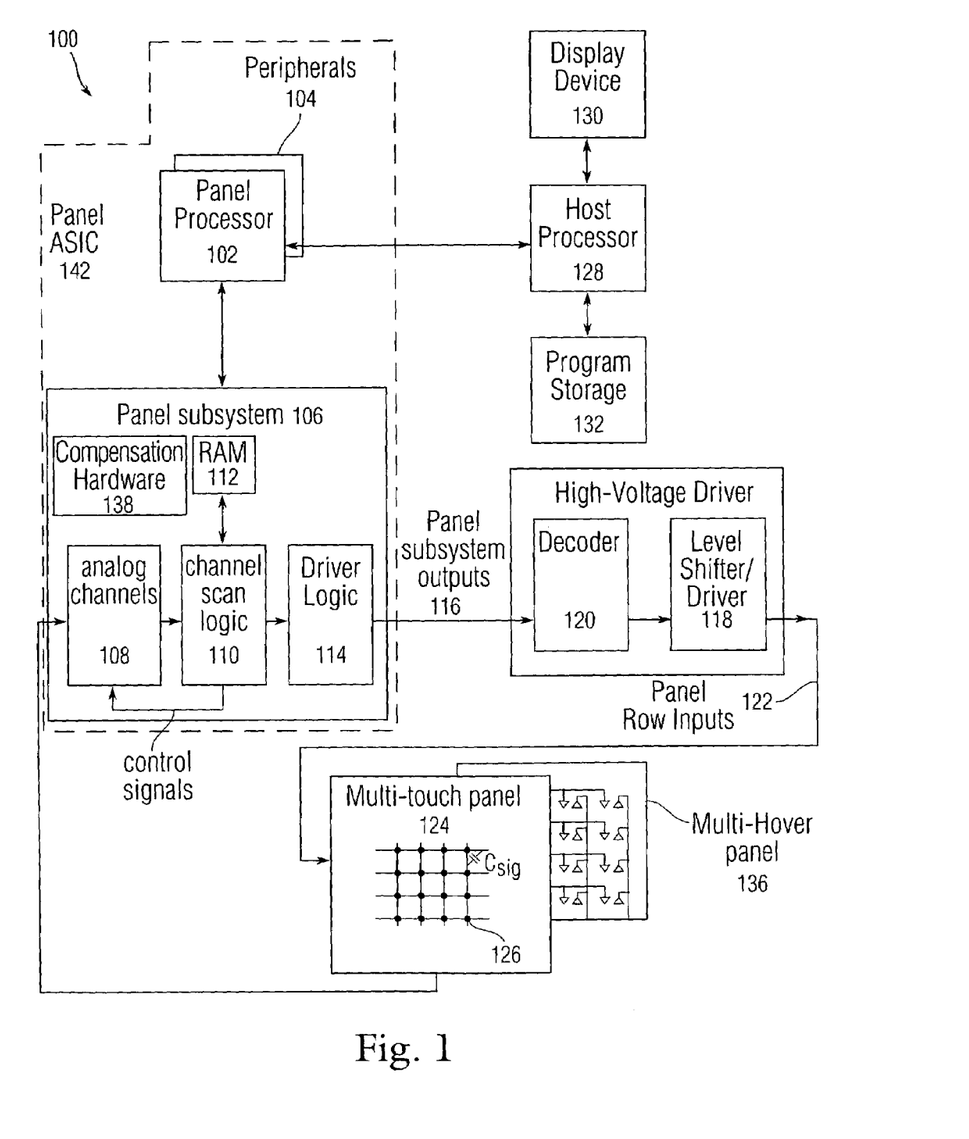
FIG. 1 illustrates exemplary computing system operable with one or more of multi-touch panel, multi-hover panel, one or more ambient light sensors, and one or more discrete proximity sensors according to one embodiment of this invention.

FIG. 1 illustrates exemplary computing system 100 operable with one or more of multi-touch panel 124, multi-hover panel 136, one or more ambient light sensors 138, and one or more discrete proximity sensors 140. Computing system 100 can include one or more panel processors 102 and peripherals 104, and panel subsystem 106. One or more processors 102 can include, for example, an ARM968 processors or other processors with similar functionality and capabilities. However, in other embodiments, the panel processor functionality can be implemented instead by dedicated logic such as a state machine. Peripherals 104 can include, but are not limited to, random access memory (RAM) or other types of memory or storage, watchdog timers and the like.

Panel subsystem 106 can include, but is not limited to, one or more analog channels 108, channel scan logic 110 and driver logic 114. Channel scan logic 110 can access RAM 112, autonomously read data from the analog channels and provide control for the analog channels. This control can include multiplexing columns of multi-touch panel 124 or multi-hover panel 136 to analog channels 108. In addition, channel scan logic 110 can control the driver logic and stimulation signals being selectively applied to rows of multi-touch panel 124 or multi-hover panel 136. Compensation hardware 138 in panel subsystem 106, UI algorithm 140 in software or firmware executed by panel processor 102 and/or channel scan logic 110 (which may be referred to collectively herein as simply UI logic) can be used to perform the sensor panel compensation according to embodiments of the invention. In some embodiments, panel subsystem 106, panel processor 102 and peripherals 104 can be integrated into a single application specific integrated circuit (ASIC).

Driver logic 114 can provide multiple panel subsystem outputs 116 and can present a proprietary interface that drives high voltage driver 118. High voltage driver 118 can provide level shifting from a low voltage level (e.g. complementary metal oxide semiconductor (CMOS) levels) to a higher voltage level, providing a better signal-to-noise (S/N) ratio for noise reduction purposes. The high voltage driver outputs can be sent to decoder 120, which can selectively connect one or more high voltage driver outputs to one or more panel row inputs 122 through a proprietary interface and enable the use of fewer high voltage driver circuits in high voltage driver 118. Each panel row input 122 can drive one or more rows in multi-touch panel 124 or multi-hover panel 136. In some embodiments, high voltage driver 118 and decoder 120 can be integrated into a single ASIC. However, in other embodiments high voltage driver 118 and decoder 120 can be integrated into driver logic 114, and in still other embodiments high voltage driver 118 and decoder 120 can be eliminated entirely.

Computing system 100 can also include host processor 128 for receiving outputs from panel processor 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as a liquid crystal display (LCD) for providing a UI to a user of the device.

Figure 2:
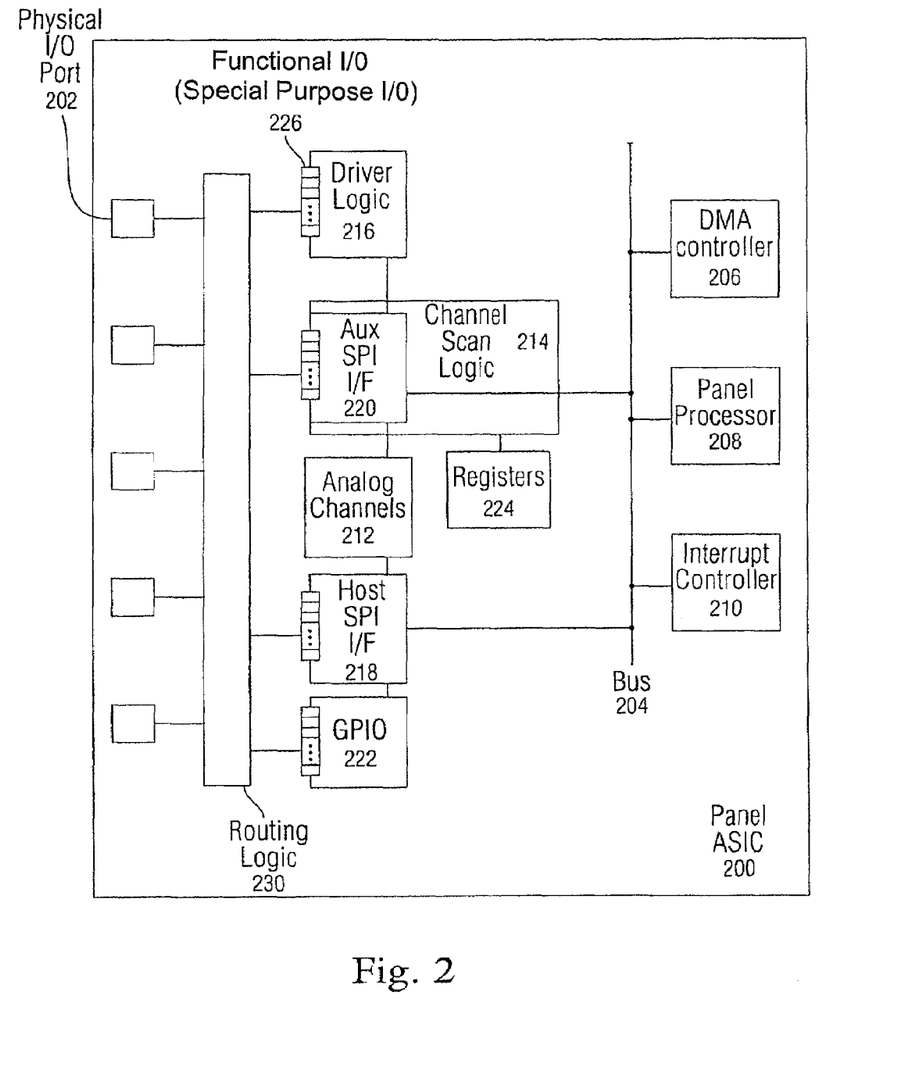
FIG. 2 illustrates an exemplary panel ASIC according to one embodiment of this invention.

In some embodiments, panel subsystem 106, panel processor 102, and peripherals 104 can be incorporated into a single panel ASIC 142. FIG. 2 illustrates an exemplary panel ASIC 200 according to one embodiment of this invention. On the periphery of panel ASIC 200 are physical I/O ports 202. The interior gate area of panel ASIC 200 can include panel processor 208, analog channels 212, channel scan logic 214, and driver logic 216, each of which corresponds to FIG. 1. One function of channel scan logic 214 may be to interface with analog channels 212, control the driving of the analog channels, and give panel processor 208 the values it needs to do its processing. Bus 204 such as an AHB bus can connect to panel processor 208 and a number of other components, such as DMA controller 206, interrupt controller 210, host SPI interface 218, and auxiliary SPI interface 220 (within channel scan logic 214). In addition, the interior gate area of ASIC 200 can also include general purpose I/O (GPIO) 222 and registers 224. GPIO 222 may be assigned to additional functional circuitry within panel ASIC 200 that is not needed in all configurations and uses. Registers 224 represent a large register file that is connected to channel scan logic 214, and can be used by the channel scan logic to set up different variables and inputs to analog channels 212.

Special purpose I/O 226 are assigned to driver logic 216, auxiliary SPI interface 220, host SPI interface 218, and GPIO 222. Special purpose I/O 226 are digital I/O (as opposed to the analog inputs 228 to analog channel 212, for example). Note that analog inputs 228 and other I/O such as clock are reset signals are not part of special purpose I/O 226, because they are either not digital or have functions that are not amenable to being reconfigured.

As mentioned above, the scarcity of physical I/O ports 202 as compared to functional I/O such as special purpose I/O 226 has heretofore restricted the ability of ASIC designs to perform a wide variety of functions, or to be dynamically configurable. Embodiments of this invention are directed to dynamically configurable routing logic 230, which allows any of the special purpose I/O 226 to be assigned to any of physical I/O ports 202 at any time. In other words, one special purpose I/O 226 can be connected to different external devices (external to ASIC 200) by being dynamically connected to different physical I/O ports 202 at different times. For example, auxiliary SPI interface 220 may be mapped to certain physical I/O ports 202 during boot-up of ASIC 200, but may be moved to other physical I/O ports after boot-up is completed. Moreover, any one special purpose I/O 226 can be routed to multiple physical I/O ports 202, which can be useful for multi-row stimulation, for example, and conversely, any one physical I/O port 202 can be routed to multiple special purpose I/O 226. In addition, multiple physical I/O ports 202 can assert a single special purpose I/O 226, which can be useful for monitoring interrupts from a number of sources.

Figure 3:
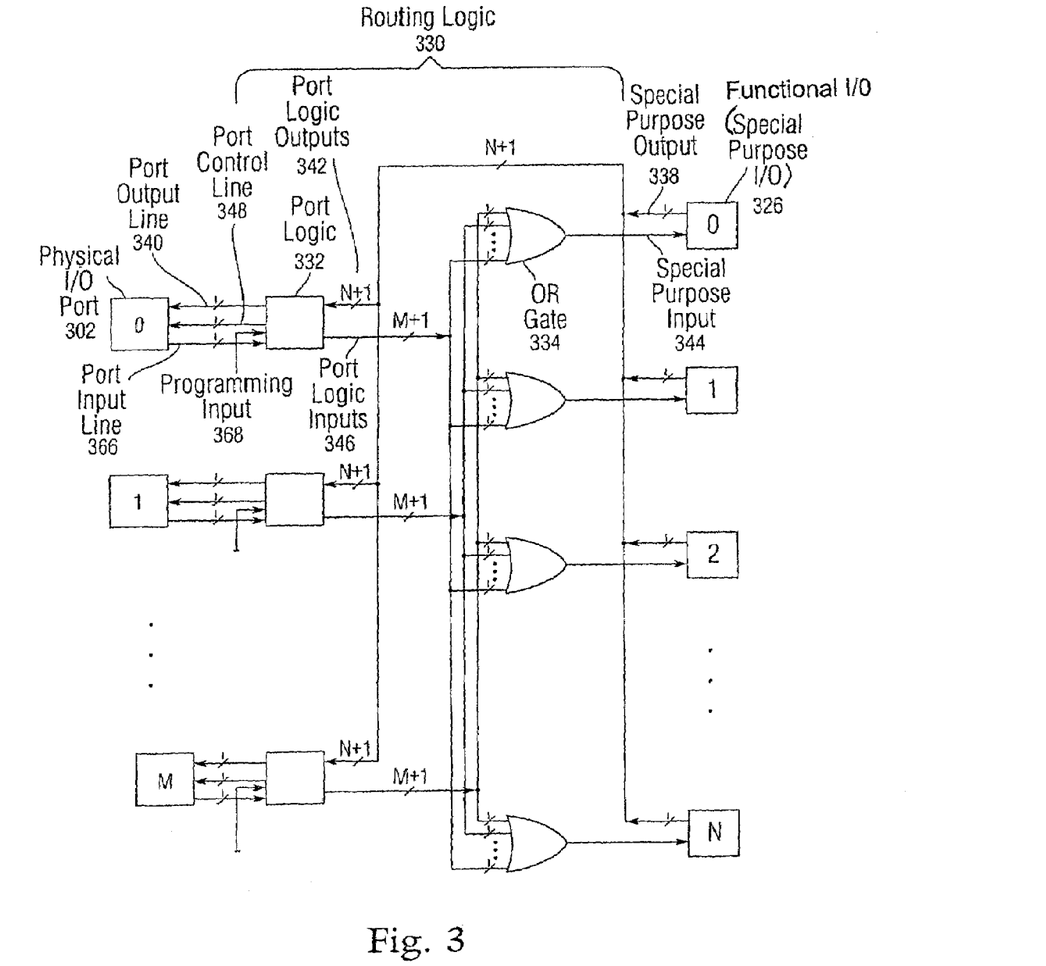
FIG. 3 is a functional block diagram of exemplary routing logic according to one embodiment of this invention.

FIG. 3 is a functional block diagram of exemplary routing logic 330 according to one embodiment of this invention, including physical I/O ports 302 and special purpose I/O 326 which correspond to similarly named lines in FIG. 2. In FIG. 3, routing logic 300 provides connections between M+1 physical I/O ports 302 and N+1 special purpose I/O 326 using port logic 332 and OR gates 334. Port logic 332 is replicated once for every physical I/O port 302, and one OR gate 334 is replicated for every special purpose I/O 326.

First, the routing of an output signal from a special purpose I/O 326 to a physical I/O port 302 will be described. Each special purpose output line 338 from every special purpose I/O 326 is routed to each port logic instance 332. In other words, there are N+1 port logic outputs 342 feeding into port logic 332. Multiplexing logic (described hereinafter) in port logic 332 selects one of these N+1 port logic outputs 342 (which correspond to special purpose output lines 338) to pass through port output line 340 to physical I/O port 302. Note that each replicated instance of port logic 332 can select the same or a different special purpose output line 338 to pass on to physical I/O port 302.

Next, the routing of port input line 366 from a physical I/O port 302 to a special purpose I/O 326 will be described. Decoding logic (described hereinafter) in port logic 332 gates port input line 366 to one or more of N+1 port logic inputs 346, with each port logic input 346 connected to a particular one of N+1 OR gates 334, each of which drives a different special purpose input line 344. (It should be noted that for purposes of naming consistency, the qualifier "output" will be used for signals destined for the physical I/O ports 302, and the qualifier "input" will be used for signals destined for the special purpose I/O 326.) Thus, the gated port input line 366 will be reflected at special purpose input line 344 only if all other inputs to that particular OR gate 334 are at a logic zero. However, the appearance of a logic one at any input of OR gate 334 will place a logic one on special purpose input line 344. As mentioned above, this capability is useful when any one of a number of multiple interrupt signals arriving at physical I/O ports 302 from outside the ASIC are designed to trigger an interrupt.

Port control line 348 is generated from a register (described hereinafter) within port logic 332, and controls whether the physical I/O port is configured as and input or an output. The register can be programmed via a programming input 368.

Figure 4:
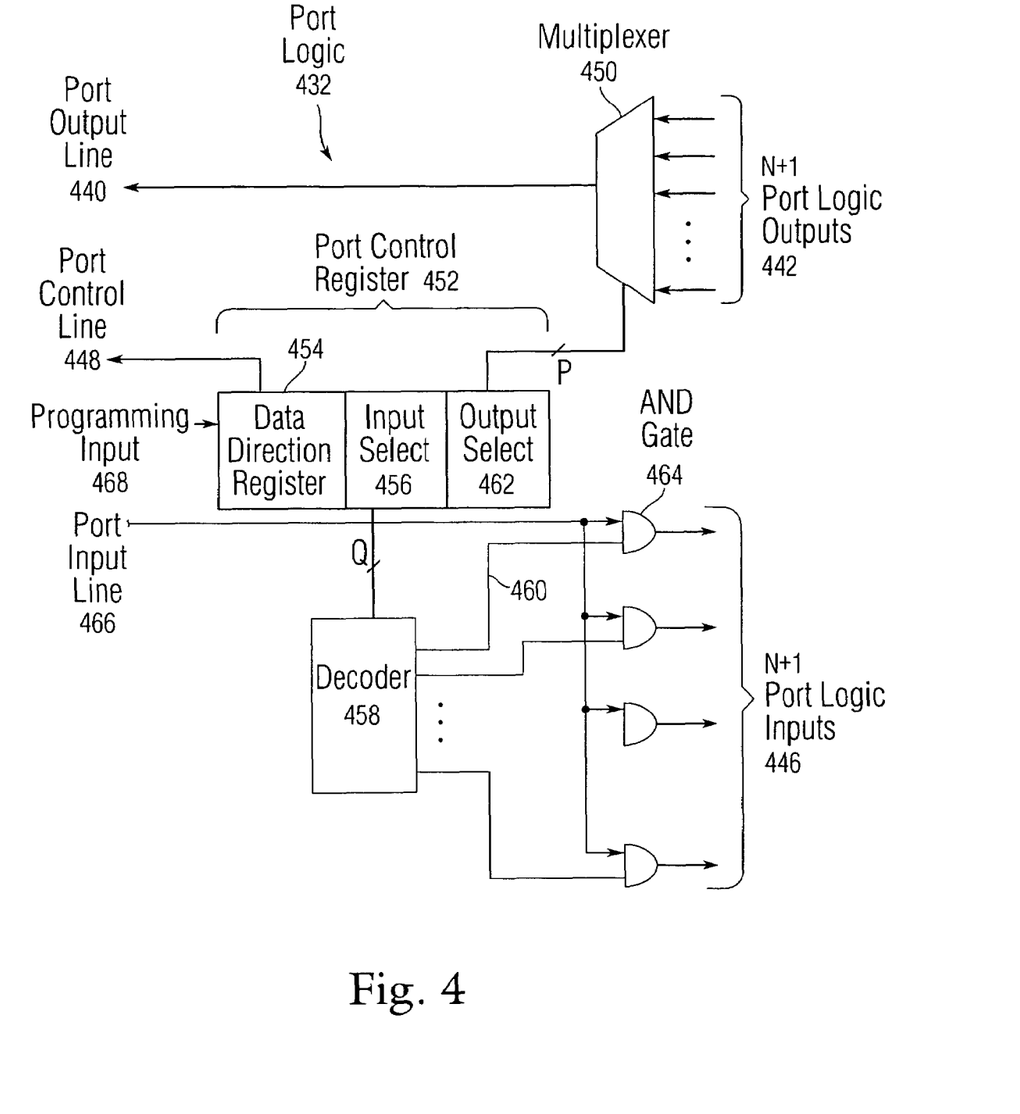
FIG. 4 is a functional block diagram of port logic according to one embodiment of this invention.

FIG. 4 is a functional block diagram of port logic 432 according to one embodiment of this invention, including port logic outputs 442, port logic inputs 446, port output line 440, port input line 466, programming input 468 and port control line 448 corresponding to similarly named lines in FIG. 3.

Port logic 432 includes port control register 452 which is programmable via programming input 468 by the panel processor within the ASIC, or an external processor through either the auxiliary SPI interface or the host SPI interface. A data direction register (DDR) or field 454 in port control register 452 controls port control line 448, and therefore the direction of the corresponding physical I/O port.

A port input select field 456 controls decoder 458, which then asserts one or more input select signals 460 to an AND gate 464 corresponding to a particular pad logic output line 466, which enables a signal on pad input line 466 to appear on the corresponding pad logic output line 446. It should be understood that the design of decoder 458 is dependent on the number of input select signals 460 that can be asserted at a time. If only one input select signal 460 is asserted at a time, only five bits are needed from port input select field 456, and decoder 458 asserts only one of the N+1 input select signals 460 based on a decoding of the five bits. However, if any number of input select signals 460 (up to the maximum of N+1) can be asserted at a time, in any combination, then port input select field 456 must provide N+1 bits directly to the N+1 input select signals 460, and decoder 458 is not needed.

A pad output select field 462 controls multiplexer 450, which selects only one port logic output 442 and allows it to pass to port output line 440. At any time during operation, a processor can write new values into the port control registers 452 associated with each physical I/O port and dynamically reconfigure the connection of physical I/O ports to special purpose I/O. Note that in some embodiments, each port control register 452 for each physical I/O port can be forced to default values upon power up.

Figure 5A:
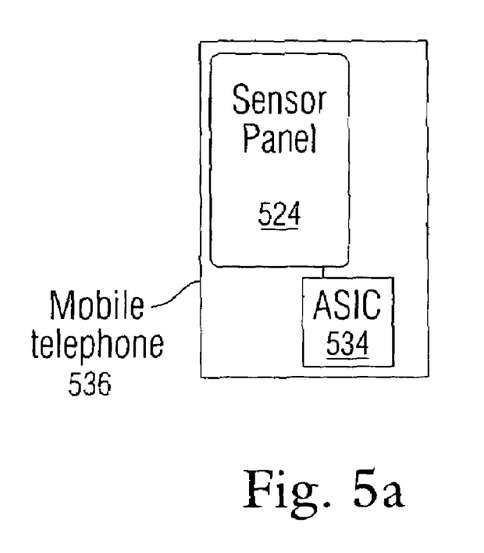
FIG. 5a illustrates an exemplary mobile telephone that can include a sensor panel and an ASIC including routing logic according to one embodiment of this invention.
Figure 5B:
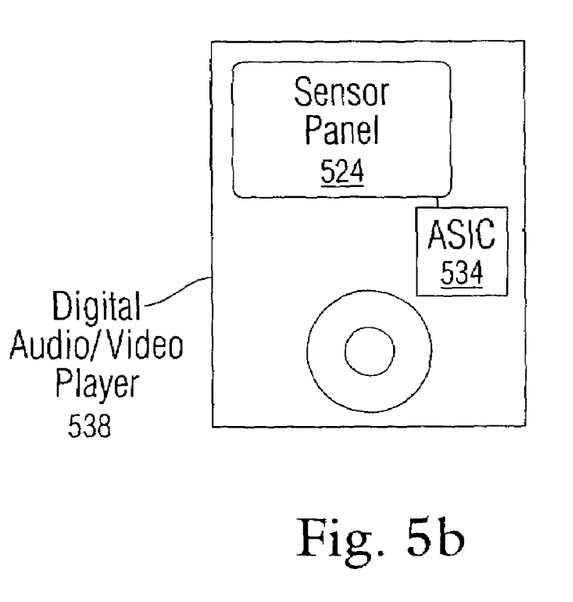
FIG. 5b illustrates an exemplary digital audio/video player that can include a sensor panel and an ASIC including routing logic according to one embodiment of this invention.

FIG. 5a illustrates an exemplary mobile telephone 536 that can include sensor panel 524 and panel ASIC 534 including the routing logic described above according to embodiments of this invention. FIG. 5b illustrates an exemplary digital audio/video player 538 that can include sensor panel 524 and panel ASIC 534 including the routing logic described above according to embodiments of this invention. The mobile telephone and digital audio/video player of FIGS. 5a and 5b can advantageously benefit from the routing logic described above which allows routing to be changed on the fly, enabling one functional circuit within the panel ASIC to access multiple different external devices through multiple physical I/O ports at different times during operation, and can allow a single ASIC design to be configured for use in different products. For example, the same ASIC design could be used in both the mobile telephone and digital audio/video player of FIGS. 5a and 5b.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An apparatus for connecting multiple physical I/O ports on an ASIC to multiple functional I/O associated with functions within the ASIC, comprising:
   a routing logic configurable in multiple routing configurations, the multiple routing configurations including
      a first configuration for connecting an output of each functional I/O to one or more physical I/O ports,
      a second configuration for connecting each physical I/O port to an input of one or more functional I/O, and
      a third configuration for gating a plurality of physical I/O ports to the input of a particular functional I/O to enable the plurality of physical I/O ports to be in communication with the input of a particular functional I/O simultaneously and enable an input signal on any of the gated physical I/O ports to assert the input of the particular functional I/O.

2. The apparatus of claim 1, the routing logic comprising:
   one port logic circuit associated with each physical I/O port, each port logic circuit configurable for
      receiving an output line from each of the multiple functional I/O and selecting one of the output lines to be output on a port output line, and
      receiving a port input line from the associated physical I/O port and enabling the port input line to be output on one or more port logic inputs; and
   one OR gate associated with each functional I/O, each OR gate configurable for receiving one port logic input from each port logic circuit and generating a logical OR of the received port logic inputs, the logical OR representing an input line of the associated functional I/O.

3. The apparatus of claim 2, each port logic circuit comprising:
   a multiplexer for receiving the output line from each of the multiple functional I/O and selecting one of the output lines to be output on the port output line;
   a decoder for generating an enable line for each of the port logic inputs; and
   one logical AND gate associated with each port logic input for gating the port input line with the enable line for each of the port logic inputs.

4. The apparatus of claim 3, the routing logic being dynamically configurable, each port logic circuit comprising:
   a programmable port control register for storing control bits for the decoder and the multiplexer and a port control line; and
   a programming input for programming the port control register.

5. The apparatus of claim 1, further comprising an ASIC incorporating the apparatus.

6. The apparatus of claim 1, further comprising a computing system incorporating the ASIC.

7. The apparatus of claim 6, further comprising a mobile telephone incorporating the computing system.

8. The apparatus of claim 6, further comprising a digital audio player incorporating the computing system.

9. A mobile telephone including an apparatus for connecting multiple physical I/O ports on an ASIC to multiple functional I/O associated with functions within the ASIC, the apparatus comprising:

a routing logic configurable in multiple routing configurations, the multiple routing configurations including
a first configuration for connecting an output of each functional I/O to one or more physical I/O ports,
a second configuration for connecting each physical I/O port to an input of one or more functional I/O, and
a third configuration for gating a plurality of physical I/O ports to the input of a particular functional I/O to enable the plurality of physical I/O ports to be in communication with the input of a particular functional I/O simultaneously and enable an input signal on any of the gated physical I/O ports to assert the input of the particular functional I/O.

10. A digital audio player including an apparatus for connecting multiple physical I/O ports on an ASIC to multiple functional I/O associated with functions within the ASIC, the apparatus comprising:
a routing logic configurable in multiple routing configurations, the multiple routing configurations including
a first configuration for connecting an output of each functional I/O to one or more physical I/O ports,
a second configuration for connecting each physical I/O port to an input of one or more functional I/O, and
a third configuration for gating a plurality of physical I/O ports to the input of a particular functional I/O to enable the plurality of physical I/O ports to be in communication with the input of a particular functional I/O simultaneously and enable an input signal on any of the gated physical I/O ports to assert the input of the particular functional I/O.

11. An apparatus for connecting multiple physical I/O ports on an ASIC to multiple functional I/O associated with functions within the ASIC, comprising:
means for connecting an output of each functional I/O to one or more physical I/O ports;
means for connecting each physical I/O port to an input of one or more functional I/O; and
means for gating a plurality of physical I/O ports to the input of a particular functional I/O to enable the plurality of physical I/O ports to be in communication with the input of a particular functional I/O simultaneously and enable an input signal on any of the gated physical I/O ports to assert the input of the particular functional I/O.

12. A routing logic for connecting multiple physical I/O ports on an ASIC to multiple functional I/O associated with functions within the ASIC in multiple routing configurations, comprising:
one port logic circuit associated with each physical I/O port, each port logic circuit configurable for receiving an output line from each of the multiple functional I/O and selecting one of the output lines to be output on a port output line, or receiving a port input line from the associated physical I/O port and enabling the port input line to be output on one or more port logic inputs; and
one OR gate associated with each functional I/O, each OR gate configurable for receiving one port logic input from each port logic circuit, receiving an asserted signal on any of the port logic inputs, and generating a logical OR of the received port logic inputs, the logical OR representing an input line of the associated functional I/O.

13. The routing logic of claim 12, each port logic circuit comprising:
a multiplexer for receiving the output line from each of the multiple functional I/O and selecting one of the output lines to be output on the port output line;
a decoder for generating an enable line for each of the port logic inputs; and
one logical AND gate associated with each port logic input for gating the port input line with the enable line for each of the port logic inputs.

14. The routing logic of claim 13, the routing logic being dynamically configurable, each port logic circuit comprising:
a programmable port control register for storing control bits for the decoder and the multiplexer and a port control line; and
a programming input for programming the port control register.

15. The routing logic of claim 12, further comprising an ASIC incorporating the routing logic.

16. The routing logic of claim 12, further comprising a computing system incorporating the ASIC.

17. The routing logic of claim 16, further comprising a mobile telephone incorporating the computing system.

18. The routing logic of claim 16, further comprising a digital audio player incorporating the computing system.

19. A mobile telephone including routing logic for connecting multiple physical I/O ports on an ASIC to multiple functional I/O associated with functions within the ASIC, the routing logic comprising:
one port logic circuit associated with each physical I/O port, each port logic circuit configurable for receiving an output line from each of the multiple functional I/O and selecting one of the output lines to be output on a port output line, or receiving a port input line from the associated physical I/O port and enabling the port input line to be output on one or more port logic inputs; and
one OR gate associated with each functional I/O, each OR gate configurable for receiving one port logic input from each port logic circuit, receiving an asserted signal on any of the port logic inputs, and generating a logical OR of the received port logic inputs, the logical OR representing an input line of the associated functional I/O.

20. A digital audio player including routing logic for connecting multiple physical I/O ports on an ASIC to multiple functional I/O associated with functions within the ASIC, the routing logic comprising:
one port logic circuit associated with each physical I/O port, each port logic circuit configurable for receiving an output line from each of the multiple functional I/O and selecting one of the output lines to be output on a port output line, or receiving a port input line from the associated physical I/O port and enabling the port input line to be output on one or more port logic inputs; and
one OR gate associated with each functional I/O, each OR gate configurable for receiving one port logic input from each port logic circuit, receiving an asserted signal on any of the port logic inputs, and generating a logical OR of the received port logic inputs, the logical OR representing an input line of the associated functional I/O.

21. A routing logic for connecting multiple physical I/O ports on an ASIC to multiple functional I/O associated with functions within the ASIC, comprising:
means associated with each physical I/O port for receiving an output line from each of the multiple functional I/O and selecting one of the output lines to be output on a port output line, or receiving a port input line from the associated physical I/O port and enabling the port input line to be output on one or more port logic inputs; and
one OR gate associated with each functional I/O, each OR gate configurable for receiving one port logic input from each port logic circuit, receiving an asserted signal on any of the port logic inputs, and generating a logical OR of the received port logic inputs, the logical OR representing an input line of the associated functional I/O.

22. A method for connecting multiple physical I/O ports on an ASIC to multiple functional I/O associated with functions within the ASIC, comprising:
dynamically configuring routing logic in one of multiple routing configurations, the multiple routing configurations including
a first configuration for connecting an output of each functional I/O to one or more physical I/O ports,
a second configuration for connecting each physical I/O port to an input of one or more functional I/O, and
a third configuration for gating a plurality of physical I/O ports to the input of a particular functional I/O to enable the plurality of physical I/O ports to be in communication with the input of a particular functional I/O simultaneously and enable an input signal on any of the gated physical I/O ports to assert the input of the particular functional I/O.

23. A method for connecting multiple physical I/O ports on an ASIC to multiple functional I/O associated with functions within the ASIC, comprising:
dynamically configuring routing logic in one of multiple routing configurations, the multiple routing configurations including
connecting an output of each functional I/O to one or more physical I/O ports,
connecting each physical I/O port to an input of one or more functional I/O, and
gating a plurality of physical I/O ports to the input of a particular functional I/O to enable the plurality of physical I/O ports to be in communication with the input of a particular functional I/O simultaneously and enable an input signal on any of the gated physical I/O ports to assert the input of the particular functional I/O.

24. The method of claim 23, further comprising, for each physical I/O port:
receiving an output line from each of the multiple functional I/O and selecting one of the output lines to be output on a port output line, or receiving a port input line from the associated physical I/O port and enabling the port input line to be output on one or more port logic inputs; and
receiving one port logic input from each port logic circuit, receiving an asserted signal on any of the port logic inputs, and generating a logical OR of the received port logic inputs, the logical OR representing an input line of the associated functional I/O.

25. The method of claim 24, further comprising, for each physical I/O port:
receiving the output line from each of the multiple functional I/O and selecting one of the output lines to be output on the port output line;
generating an enable line for each of the port logic inputs; and
gating the port input line with the enable line for each of the port logic inputs.

26. The method of claim 25, further comprising, for each physical I/O port, providing for dynamically connecting the physical I/O port to multiple functional I/O by maintaining a programmable register for controlling the selection of one of the output lines to be output on the port output line and for controlling an assertion of one of the enable lines.

27. The apparatus of claim 1, further comprising a multi-touch panel incorporating the apparatus.

28. A multi-touch panel including an apparatus for connecting multiple physical I/O ports on an ASIC to multiple functional I/O associated with functions within the ASIC, the apparatus comprising:
a routing logic configurable in multiple routing configurations, the multiple routing configurations including
a first configuration for connecting an output of each functional I/O to one or more physical I/O ports,
a second configuration for connecting each physical I/O port to an input of one or more functional I/O, and
a third configuration for gating a plurality of physical I/O ports to the input of a particular functional I/O to enable the plurality of physical I/O ports to be in communication with the input of a particular functional I/O simultaneously and enable an input signal on any of the gated physical I/O ports to assert the input of the particular functional I/O.

* * * * *